Figure 1:
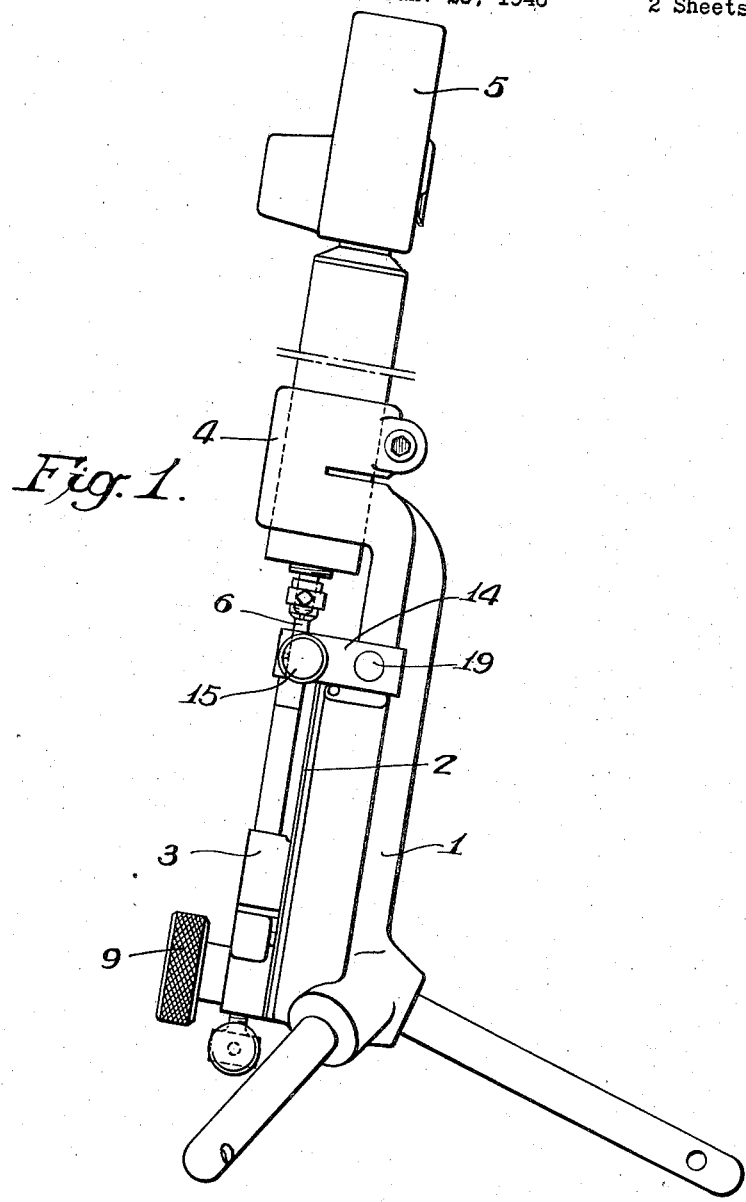

April 27, 1948.  H. V. TÖRNEBOHM  2,440,646
GAGING APPARATUS FOR ADJUSTING GAGE BLOCKS OF THE ADJUSTABLE TYPE
Filed Jan. 23, 1946  2 Sheets-Sheet 1

Inventor
Hilding Valdemar Tornebohm
by his Attorneys
Howson + Howson

April 27, 1948.　　　H. V. TÖRNEBOHM　　　2,440,646
GAGING APPARATUS FOR ADJUSTING GAGE BLOCKS OF THE ADJUSTABLE TYPE
Filed Jan. 23, 1946　　　2 Sheets-Sheet 2
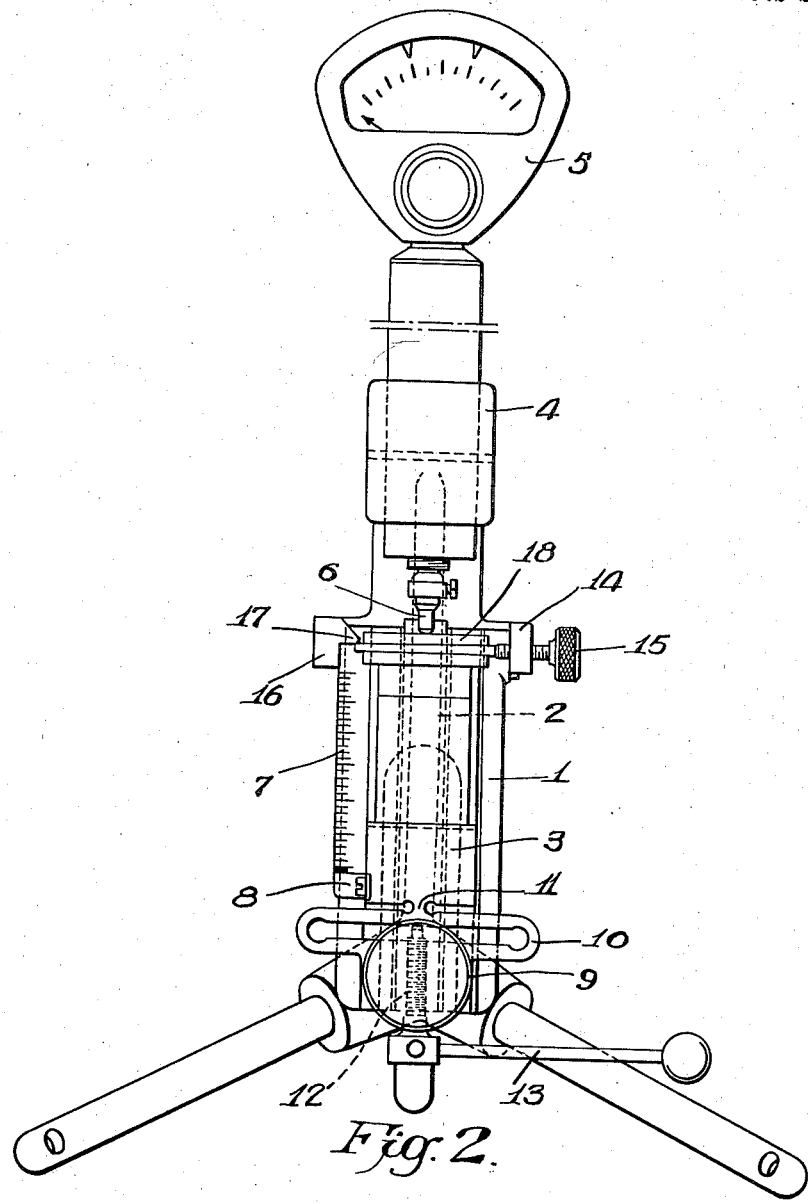
Fig. 2.
Fig. 3
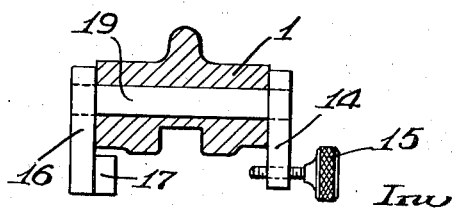
Inventor:—
Hilding Valdemar Törnebohm
by his Attorneys
Howson + Howson Patented Apr. 27, 1948

2,440,646

UNITED STATES PATENT OFFICE 2,440,646

GAGING APPARATUS FOR ADJUSTING GAGE BLOCKS OF THE ADJUSTABLE TYPE

Hilding Valdemar Törnebohm, Goteborg, Sweden, assignor to Aktiebolaget Svenska Kullagerfabriken, Goteborg, Sweden, a corporation of the Kingdom of Sweden Application January 23, 1946, Serial No. 642,799
In Sweden January 24, 1945

3 Claims. (Cl. 33—147)

The present invention relates to an apparatus, which is intended not only for gaging in the ordinary manner but also for adjusting gage blocks of adjustable type. Such gage blocks may comprise three main parts, of which one has a pair of plane parallel gaging surfaces, while the other two are wedge-shaped and have the same angle. When the three parts are assembled, the outer, or gaging surfaces, will therefore be parallel with each other. The adjustment of the gage block is made by shifting the intermediate member relative to the other two members, the dimension increasing or decreasing as the intermediate member is shifted in one direction or the other.

The purpose of the invention is to provide an apparatus in which this adjustment can be accurately and conveniently carried out, but in which the means used for making the adjustment can be moved out of the way so that the apparatus can be used for carrying out measurements in the ordinary manner.

One embodiment of the apparatus is illustrated in the accompanying drawings in which Fig. 1 shows a side view of the apparatus, Fig. 2 is a front view and Fig. 3 shows a detail of the adjusting means from above.

The frame, or standard, 1 of the apparatus is provided with a guide 2 for a gaging table 3, upon the upper polished supporting surface of which the combination of gaging blocks (including at least one adjustable block) to be adjusted is placed, with the adjustable gage on top. A dial indicator or other suitably sensitive instrument 5 is mounted in a socket 4. The contact point 6 of the instrument will then engage the upper gaging surface of the adjustable gaging block. An approximate adjustment of the table relative to the instrument can then be made by moving the table 3 along the guide 2 to raise or lower it as required and the approximate distance of the supporting surface of the table from the contact point of the dial instrument is read on the scale 7 against the index 8 on the table. When the approximate adjustment is complete the table is locked in position by means of the screw 9.

The table comprises an upper part and a resilient lower part 10 having the form of a bow, the parts being connected by a narrow neck 11. By flexing the bow of the lower part it is possible to raise or lower the plane of the table about .2 mm. for making an accurate adjustment of the position of the said plane. The flexing of the lower part is accomplished by turning the screw 12 by means of the lever 13.

An adjusting device is mounted on the upper part of the apparatus for carrying out the adjustment of the gage block. This device can be raised to be out of the way when the gage block combination is being positioned in the apparatus or removed, but may be lowered when the actual adjustment is to be made. One arm 14 of the device carries a screw 15 for acting on the intermediate part of the gage block and the other arm 16 is provided with an edge 17 which forms an abutment for the upper part of the gage block. The arms 14 and 16 are fixed to a spindle 19 which is turnable in the frame 1 of the apparatus.

The adjustable gage block 18 is positioned with its parallel member downwards and with the thick end of the intermediate member toward the right in the figure, i. e. toward the screw 15. The thickness of the adjustable gage is therefore increased when the screw is screwed in. Adjustments of the intermediate member in the other direction must however be carried out by hand.

Before the apparatus is used the gaging instrument is inserted in the socket 4 and locked in position so that with the gaging table in its upper position, the index 8 pointing to "0" on the scale 7 and the contact point 6 of the dial instrument bearing against the plane of the table the reading of the instrument will be "0" when the lever 13 is approximately in its central position. The arms 14 and 16 should be in raised position.

To adjust a combination of gage blocks to a dimension of 23.712 mm. it is preferable to proceed in the following manner.

Adjust the table so that the index 8 points to about 23.5 on the scale 7. A combination of ordinary gage blocks of for instance 10, 10 and 3.700 mm. to form the dimension 23.700 is now placed on the table. An adjustment is made with the aid of the lever 13 so that the index of the dial instrument again points to "0." The apparatus is now adjusted to the dimension 23.700 mm. One of the 10 mm. gages is now removed and is replaced by an adjustable gage block, adjustable within the limits of about 9.5 to 10.5 mm., said block having previously been adjusted to or near its low limit. The arms 14 and 16 are lowered and the edge 17 will then be located opposite the upper member of the adjustable gage block as shown in Fig. 2, while the screw 15 will be opposite the intermediate member. The screw is turned, thereby moving the intermediate member to the left and increasing the effective thickness of the block until the instrument shows a reading of +12 (.012 mm.). In this position the dimension of the whole combination of gage blocks is 23.700+0.12=23.712 mm.

To obtain a combination of gage blocks having a dimension of for instance 23.756 mm. proceed as follows.

Adjust the table to a reading of about 23.5 on the scale 7. By means of gage blocks of 10, 10 and 3.800 mm. form the combination 23.800 mm. Adjust the position of the table with the lever 13 so that the index of the instrument points to the reading +20, i. e. raise the table .020 mm. One of the 10 mm. gage blocks is now removed and replaced by the adjustable gage block, which in accordance with the principle set forth in the preceding example has been set to its low limit, after which the arms 14 and 16 are lowered. The adjustable gage block is now adjusted to an increased thickness by means of the screw 15 so that the reading of the dial instrument is —24. The movement from +20 to —24 implies a decrease of .044 mm. from the value 23.800. The gage combination therefore now has the dimension 23.800—.044=23.756 mm.

When the arms 14 and 16 are raised the apparatus can be used for measuring in the usual manner and its use is therefore not confined to the adjustment of adjustable gages.

The apparatus may be modified in a number of ways without departing from the spirit of the invention. The arms may be so arranged that they may be moved out of the way in any suitable manner, for instance by mounting them on a slide, or they may pivot about an axis parallel to the frame of the apparatus. All that is required is that the design be sufficiently rigid to permit the gage to be accurately adjusted.

Having thus described my invention, I claim and desire to secure by Letters Patent the following.

1. A gaging apparatus comprising a frame, a work supporting table and an indicating instrument mounted on the frame one above the other, means for adjusting the distance between the table and the instrument, and means for adjusting an adjustable gage block, said gage block adjusting means comprising a pair of arms mounted on the frame in a manner enabling them to be retractably interposed between the said table and the said instrument, means on one of said arms forming an abutment for one of the members of the gage block, and means on the other arm adjustable in a direction towards and from the said abutment for acting on another member of the gage block.

2. A gaging apparatus comprising a frame, a work supporting table and an indicating instrument mounted on the frame one above the other, means for adjusting the distance between the table and the instrument and means for adjusting an adjustable gage block, said gage block adjusting means comprising a pair of arms pivotably mounted on the frame to enable them to be retractably interposed between the said table and the said instrument, means on one of said arms forming an abutment for one of the members of the gage block, and means on the other arm adjustable in a direction towards and from the said abutment for acting on another member of the gage block.

3. A gaging apparatus comprising a frame, a work supporting table and an indicating instrument mounted on the frame one above the other, means for adjusting the distance between the table and the instrument and means for adjusting an adjustable gage block having a plurality of relatively adjustable members, said gage block adjusting means comprising a pair of arms fixed one at each end of a spindle, said spindle being turnable in the said frame about an axis substantially parallel with the plane of the said table and located between the table and the instrument, means on one of the said arms forming an abutment for one of the members of the gage block and means on the other arm adjustable in a direction towards and from the said abutment for acting on another member of the gage block.

HILDING VALDEMAR TÖRNEBOHM.

REFERENCES CITED

The following references are of record in the file of this patent:

UNITED STATES PATENTS

| Number | Name | Date |
|---|---|---|
| 541,749 | Harris | June 25, 1895 |
| 1,436,656 | Horstmann et al. | Nov. 28, 1922 |
| 1,478,954 | Hardaker | Dec. 25, 1923 |
| 1,489,577 | Hanson | Apr. 8, 1924 |
| 1,613,678 | Schwarz, Jr. | Jan. 11, 1927 |
| 2,307,831 | Emery | Jan. 12, 1943 |

FOREIGN PATENTS

| Number | Country | Date |
|---|---|---|
| 10,617 | Great Britain | May 15, 1908 |